United States Patent
Nakashima et al.

(10) Patent No.: US 10,487,246 B2
(45) Date of Patent: Nov. 26, 2019

(54) ADHESIVE SHEET

(71) Applicant: NAKASHIMA RUBBER INDUSTRY CO., LTD., Fukuoka (JP)

(72) Inventors: Mikio Nakashima, Kurume (JP); Yoshikuni Takata, Kurume (JP); Takemi Yoshizumi, Kurume (JP); Rikito Eguchi, Fujisawa (JP)

(73) Assignee: NAKASHIMA RUBBER INDUSTRY CO., LTD., Fukuoka (JP)

( * ) Notice: Subject to any disclaimer, the term of this patent is extended or adjusted under 35 U.S.C. 154(b) by 0 days.

(21) Appl. No.: 15/556,640

(22) PCT Filed: Mar. 11, 2015

(86) PCT No.: PCT/JP2015/001336
§ 371 (c)(1),
(2) Date: Sep. 8, 2017

(87) PCT Pub. No.: WO2016/142966
PCT Pub. Date: Sep. 15, 2016

(65) Prior Publication Data
US 2018/0057719 A1    Mar. 1, 2018

(51) Int. Cl.
*C09J 123/12* (2006.01)
*C09J 5/06* (2006.01)
(Continued)

(52) U.S. Cl.
CPC .......... *C09J 123/12* (2013.01); *C08G 63/183* (2013.01); *C08L 23/12* (2013.01); *C09J 5/06* (2013.01);
(Continued)

(58) Field of Classification Search
CPC ........ C09J 123/12; C09J 7/405; C08G 63/183
See application file for complete search history.

(56) References Cited

U.S. PATENT DOCUMENTS 6,063,494 A * 5/2000 Schumann ................. C09J 7/00
                                                        428/354
2006/0078742 A1* 4/2006 Kauffman ................. B32B 7/12
                                                        428/411.1

FOREIGN PATENT DOCUMENTS

JP    S62-254874 A    11/1987
JP    H04-361032 A    12/1992
(Continued)

OTHER PUBLICATIONS

International Search Report issued in PCT/JP2015/001336; dated May 19, 2015.
(Continued)

*Primary Examiner* — Victor S Chang
(74) *Attorney, Agent, or Firm* — Studebaker & Brackett PC

(57) ABSTRACT

The adhesive sheet for bonding an unvulcanized rubber to a metal, including, a release film, which includes a first film layer made of polypropylene and a second film layer made of polyethylene terephthalate, and which is formed as an integrated film, an upper adhesive layer obtained by applying a solvent dispersed type vulcanization adhesive having reactivity with the unvulcanized rubber to a side of the first film layer of the release film and drying the solvent dispersed type vulcanization adhesive, and a lower adhesive layer obtained by, after drying the upper adhesive layer, applying an adhesive having reactivity with the metal onto the upper adhesive layer, and by drying the adhesive.

19 Claims, 9 Drawing Sheets

(51) Int. Cl.
  *C09J 7/00* (2018.01)
  *C09J 201/00* (2006.01)
  *C09J 7/40* (2018.01)
  *C08G 63/183* (2006.01)
  *C08L 23/12* (2006.01)
  *C09J 167/02* (2006.01)

(52) U.S. Cl.
  CPC ................ *C09J 7/00* (2013.01); *C09J 7/405* (2018.01); *C09J 167/02* (2013.01); *C09J 201/00* (2013.01); *C08L 2203/16* (2013.01); *C09J 2417/00* (2013.01); *C09J 2423/105* (2013.01); *C09J 2467/005* (2013.01)

(56) References Cited

FOREIGN PATENT DOCUMENTS

| | | |
|---|---|---|
| JP | H05-027417 A | 2/1993 |
| JP | H06-041502 A | 2/1994 |
| JP | H08-048007 A | 2/1996 |
| JP | H09-109343 A | 4/1997 |
| JP | 2001-260233 A | 9/2001 |
| JP | 2006-077238 A | 3/2006 |
| JP | 2010-013567 A | 1/2010 |
| JP | 2010-116532 A | 5/2010 |

OTHER PUBLICATIONS

Written Opinion issued in PCT/JP2015/001336; dated May 19, 2015.

The International Preliminary Report on Patentability (Chapter I) and Translation of Written Opinion of the International Searching Authority; PCT/JP2015/001336; dated Sep. 12, 2017.

Extended European Search Report (EESR) dated Nov. 30, 2017, from corresponding EP Appl No. 15884466.2, 8 pp.

\* cited by examiner

ADHESIVE SHEET

TECHNICAL FIELD

The present invention relates to an improved adhesive sheet to be used for bonding an unvulcanized rubber to a metal.

BACKGROUND ART

Hitherto, as disclosed in, for example, Patent Literature 1, there has been a method involving, when a metal and an unvulcanized rubber are bonded to each other through an adhesive, applying a pressure, with heating, to the adhesive to vulcanize the rubber, to thereby bond the rubber and the metal to each other.

In such bonding method, first, it is necessary to apply a solvent dispersed type vulcanization adhesive to the surface of a metal with a brush, a spray, or the like. As used herein, the term "solvent dispersed type vulcanization adhesive" refers to a polymer compound having adhesiveness in which a filler, a cross-linking agent, a stabilizer, and the like are dispersed or dissolved in an organic mixed solvent. In this operation, a volatile organic compound (hereinafter referred to as "VOC") is used as a solvent for the adhesive. In recent years, in consideration of the health of workers and the environment, it has been necessary to suppress the emission amount of the VOC, and each operator has been required to voluntarily reduce the emission amount of the VOC, in addition to the emission constraint by the law and the administrative guidance. Thus, in a working area for performing bonding, specific means for suppressing the emission amount of the VOC is necessary. In order to suppress the emission amount of the VOC, it is necessary to improve the working environment including a facility and a place. However, when the working environment is improved in a working area for performing bonding, the scale of the working area becomes larger. Further, it is necessary to thinly apply the solvent dispersed type vulcanization adhesive. However, when an attempt is made to form a thin applied layer of the adhesive with a brush, a spray, or the like, it is difficult to manage the film thickness so that the film thickness may become uniform. Further, there have been problems in that the coating efficiency is unsatisfactory, and the amount of the adhesive that dissipates without being applied to the surface of the metal increases.

In view of the foregoing, in Patent Literature 2, there is a disclosure of an adhesive sheet configured to bond an unvulcanized rubber to a metal, the sheet including: a release film made of a polymer compound; an upper adhesive layer obtained by applying a solvent dispersed type vulcanization adhesive having reactivity with the rubber onto one surface of the release film and drying the solvent dispersed type vulcanization adhesive; and a lower adhesive layer obtained by applying, after drying the upper adhesive layer, an adhesive having reactivity with the metal onto a surface of the upper adhesive layer on an opposite side of the release film and drying the adhesive.

This adhesive sheet serves to bond the rubber to the metal as described below. A metal to be bonded to a rubber is set, and a surface of the lower adhesive layer of the adhesive sheet on an opposite side of the upper adhesive layer is pressed against the metal to be fixed to an upper surface of the metal. In this state, a rubber mat is placed on the release film, and the metal is heated while a pressure is uniformly applied to the rubber mat. Then, after the lower adhesive layer is firmly fixed to the metal, the release film of the adhesive sheet is removed from the upper adhesive layer. A pressure is applied, with heating, to the unvulcanized rubber on a surface from which the release film has been removed, to thereby vulcanize the unvulcanized rubber and firmly fix the upper adhesive layer and the rubber to each other. In this adhesive sheet, the VOC is removed in advance in a manufacturing stage of the adhesive sheet, and hence there is an advantage in that the amount of the VOC at a time of the bonding of the rubber to the metal can be reduced.

CITATION LIST

Patent Literature

PTL 1: Japanese Patent Application Laid-Open No. 2001-260233
PTL 2: Japanese Patent No. 4681634

SUMMARY OF INVENTION

Technical Problem

However, this adhesive sheet has a problem in that, when the release film of the adhesive sheet is removed from the upper adhesive layer after the lower adhesive layer is firmly fixed to the metal, the release film is not easily removed. Therefore, it is conceivable that, in the manufacturing stage of the adhesive sheet, as a previous step of the step of forming the upper adhesive layer on the release film, the surface of the release film is subjected to blast treatment to be made rough, to thereby make it easy to remove the release film. However, actually, even when the surface of the release film is treated so as to be made rough as described above, there is a problem in that it is still difficult to remove the release film because the release film is thin.

As countermeasures against the above-mentioned problem, it is conceivable to select, in particular, a material excellent in releasability, for example, polypropylene as the release film. However, the material excellent in releasability has problems in that the material is liable to swell with a solvent, and further, after an adhesive is applied, a large number of large creases are formed in the release film by heat at a time of the drying of the adhesive. In view of the foregoing, there is a demand for an adhesive sheet including a release film in which creases and the like are not formed and which is easily removed.

Solution to Problem

The above-mentioned problems are solved by an adhesive sheet for bonding an unvulcanized rubber to a metal, including a release film that includes a first film layer made of polypropylene and a second film layer made of polyethylene terephthalate, and that is formed as an integrated film, an upper adhesive layer obtained by applying a solvent dispersed type vulcanization adhesive having reactivity with the unvulcanized rubber to a side of the first film layer of the release film and drying the solvent dispersed type vulcanization adhesive, and a lower adhesive layer obtained by, after drying the upper adhesive layer, applying an adhesive having reactivity with the metal onto the upper adhesive layer, and by drying the adhesive.

The above-mentioned problems are solved by a method of bonding an unvulcanized rubber to a metal through use of the above-mentioned adhesive sheet. The method includes the steps of pressing, under a state in which a metal is placed on a lower side, a surface of the lower adhesive layer of the adhesive sheet on an opposite side of the upper adhesive layer onto the metal to fix the lower adhesive layer to an upper surface of the metal, placing a rubber mat on the release film, followed by heating of the metal while uniformly applying a pressure to the rubber mat; after firmly fixing the lower adhesive layer to the metal, removing the release film from the upper adhesive layer, and applying a pressure with heating to the unvulcanized rubber on a surface from which the release film has been removed, to thereby vulcanize the unvulcanized rubber and firmly fix the upper adhesive layer and the unvulcanized rubber to each other.

Advantageous Effects of Invention

According to the present invention, there can be provided an adhesive sheet including a release film which is easily removed from an upper adhesive layer and in which creases and the like are not generated.

DESCRIPTION OF EMBODIMENTS

Figure 1:
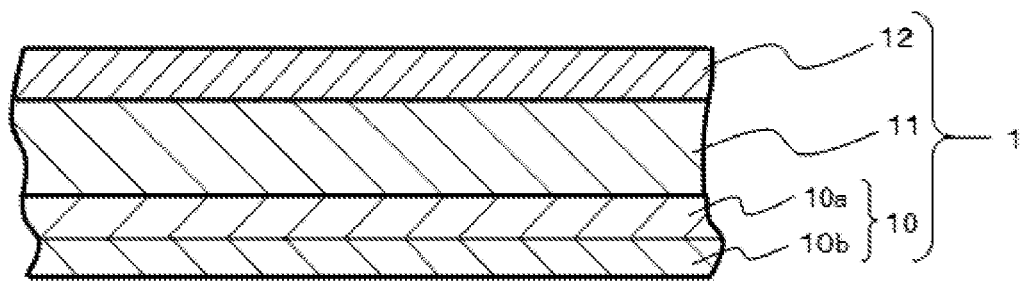
FIG. 1 A schematic sectional view of an adhesive sheet of the present invention.
Figure 2:
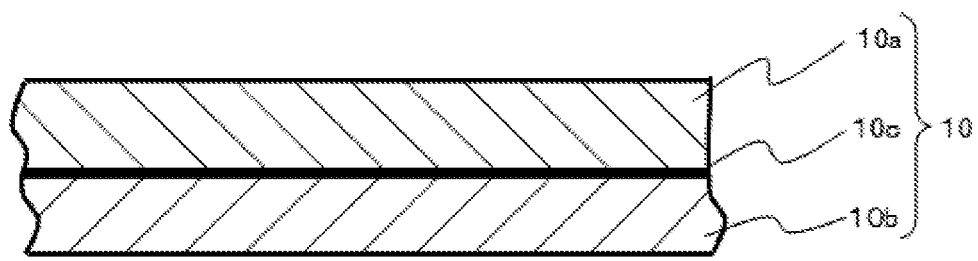
FIG. 2 A schematic sectional view of a release film of the adhesive sheet of the present invention.

The configuration of an adhesive sheet 1 of the invention of the present application is described with reference to FIG. 1 and FIG. 2. FIG. 1 is a view for illustrating a cross-section of the adhesive sheet 1 of the invention of the present application. In the adhesive sheet 1 of the invention of the present application, an upper adhesive layer 11 is applied onto a release film 10. A lower adhesive layer 12 is applied onto a surface of the upper adhesive layer 11 on an opposite side of a surface on which the release film 10 is formed. FIG. 2 is a view in which a portion corresponding to the release film 10 is enlarged in the adhesive sheet 1 of the invention of the present application. The release film 10 includes a first film layer 10a made of polypropylene and a second film layer 10b made of polyethylene terephthalate. The temperature of the release film 10 is increased to more than 100° C. in a drying step after the upper adhesive layer 11 and the lower adhesive layer 12 are applied to the release film 10, respectively. Therefore, when the release film 10 is formed of only a film of polypropylene having a low heat-resistant temperature, creases are formed after the upper adhesive layer 11 and the lower adhesive layer 12 are applied to the release film 10, respectively. Further, polypropylene has solubility in a ketone-based solvent. Therefore, the release film 10 has a double-layer structure including a layer of a polypropylene film (first film layer) and a layer of a polyethylene terephthalate film (second film layer), and is integrally formed as one release film layer. As a method of integrally forming the layer of a polypropylene film (first film layer) and the layer of a polyethylene terephthalate film (second film layer) as one release film layer, there is given, for example, a method involving bonding these layers to each other through use of an adhesive. That is, the following method is given: an adhesive 10c is applied to any one surface of the first film 10a and the second film 10b, and the first film layer 10a and the second film layer 10b are subjected to pressure bonding to form one release film layer. As the adhesive 10c, there is given, for example, an acrylic pressure-sensitive adhesive, which is a pressure-sensitive adhesive of a strong pressure-sensitive adhesive type having a pressure-sensitive adhesive property at room temperature. The first film 10a made of polypropylene has a thickness of 10 micrometers or more and 50 micrometers or less. The second film layer 10b made of polyethylene terephthalate has a thickness within a range of from more than 10 micrometers to 300 micrometers or less. The first film layer 10a made of polypropylene serves to ensure releasability, and the second film layer 10b made of polyethylene terephthalate serves to reinforce the first film layer 10a. Therefore, it is appropriate that the first film layer 10a be selected so as to be thinner than the second film layer 10b. Further, as another method of integrally forming the layer of a polypropylene film (first film layer) and the layer of a polyethylene terephthalate film (second film layer) as one release film layer, for example, a method involving forming the layer of a polypropylene film and the layer of a polyethylene terephthalate film by coextrusion is conceivable. A general coextrusion method can be used as the coextrusion. Those methods can be changed in accordance with the intended use as described below. However, at least when the upper adhesive layer 11 and the lower adhesive layer 12 are formed, it is necessary to integrally form the adhesive layer 11 and the lower adhesive layer 12 as a release film. It is necessary that the upper adhesive layer 11 and the lower adhesive layer 12 be formed on the release film without creases.

Here, when the first film layer 10a and the second film layer 10b are formed as one release film layer, the features at a time of use of the release film layer may be varied through the manner of formation. For example, when the first film layer 10a and the second film layer 10b are formed as one release film layer, the first film layer 10a and the second film layer 10b may be bonded to each other so that the second film layer 10b can be separated from the first film layer 10a after the upper adhesive layer 11 and the lower adhesive layer 12 are applied to the release film. In this case, the adhesive sheet can be used in a state of being backed with only the soft first film layer 10a without the hard second film layer 10b. That is, the sheet has the following feature: when the lower adhesive layer 12 is attached to the metal, even in the case where a site to be adhered has, for example, a complicated shape surface, the lower adhesive layer 12 is easily matched with the shape of the site to be adhered because the adhesive sheet is backed with only the soft first film layer 10a. Further, the soft first film layer 10a is excellent in releasability, and hence the upper adhesive layer 11 is easily removed from the release film even after the lower adhesive layer 12 is attached to the metal. Advantageous effects are exhibited when the site to be adhered has a complicated shape.

Meanwhile, the following disadvantage is caused by the absence of the second film layer 10b. When the temperature is increased in order to bond the lower adhesive layer 12 to the metal and bond the upper adhesive layer 11 to the rubber, creases are liable to be formed because the first film layer 10a is soft. Thus, when a site to be adhered does not have a complicated shape, it is appropriate that the first film layer 10a and the second film layer 10b be firmly bonded to each other strongly so that the second film layer 10b cannot be separated from the first film layer 10a. The second film layer 10b is strongly bonded to the first film layer 10a, for example, with an adhesive having a moderate to strong pressure-sensitive adhesive property. In this case, the first film layer 10a and the second film layer 10b can also be firmly bonded to each other strongly by coextrusion.

In order to bond the first film layer 10a and the second film layer 10b to each other in a state in which the second film layer 10b can be separated from the first film layer 10a, or in contrast, in order to bond the second film layer 10b to the first film layer 10a in a state in which the second film layer 10b is not separated from the first film layer 10a, after the upper adhesive layer 11 and the lower adhesive layer 12 are applied to the release film 10, the degree of pressure-sensitive adhesion of the adhesive between the first film layer 10a and the second film layer 10b may be regulated. The pressure-sensitive adhesive strength can be changed, for example, by changing the amount of additives to be added to an acrylic resin or changing an acrylic resin component itself of the adhesive.

Further, high crystalline type polypropylene having a crystallization degree of 60% or more of the entire capacity is preferably used as polypropylene that is a material for the first film 10a. When the high crystalline type polypropylene is used, releasability is even more improved. Satisfactory releasability and stiffness that does not cause creases can be realized by: selecting polypropylene as the first film 10a to which the upper adhesive layer 11 is bonded and which is required to have releasability; and reinforcing the first film 10a with the second film 10b made of polyethylene terephthalate. The foregoing cannot be realized with other polymer films.

The upper adhesive layer 11 is formed on the first film 10a side of the release film 10. The upper adhesive layer 11 is formed by applying a solvent dispersed type vulcanization adhesive having reactivity with the unvulcanized rubber and drying the solvent dispersed type vulcanization adhesive. As described above, the solvent dispersed type vulcanization adhesive is defined as a polymer compound having adhesiveness in which a filler, a cross-linking agent, a stabilizer, and the like are dispersed or dissolved in an organic mixed solvent. As the upper adhesive layer 11, there is given, for example, a layer containing an adhesive including a component including at least one selected from chlorosulfonated polyethylene, a chlorinated natural rubber, a maleimide-based compound, a nitroso-based compound, an acid scavenger, a cross-linking agent for CSM rubber and a cross-linking accelerator, carbon black, and a silica-based filler.

The lower adhesive layer 12 is applied to the upper adhesive layer 11. The lower adhesive layer 12 is obtained by applying an adhesive having reactivity with the metal to the upper adhesive layer 11, and by drying the adhesive. As the lower adhesive layer 12, there is given, for example, a layer containing an adhesive including a component including at least one selected from phenol and a phenol-based derivative resin, a bisphenol-based epoxy resin, a polyfunctional aromatic epoxy resin, a chlorinated natural rubber, chlorine-based polyethylene, chlorinated polypropylene, chlorinated polyolefin, an acid scavenger, an amine-based curing agent, a silica-based filler, and carbon black.

Figure 3:
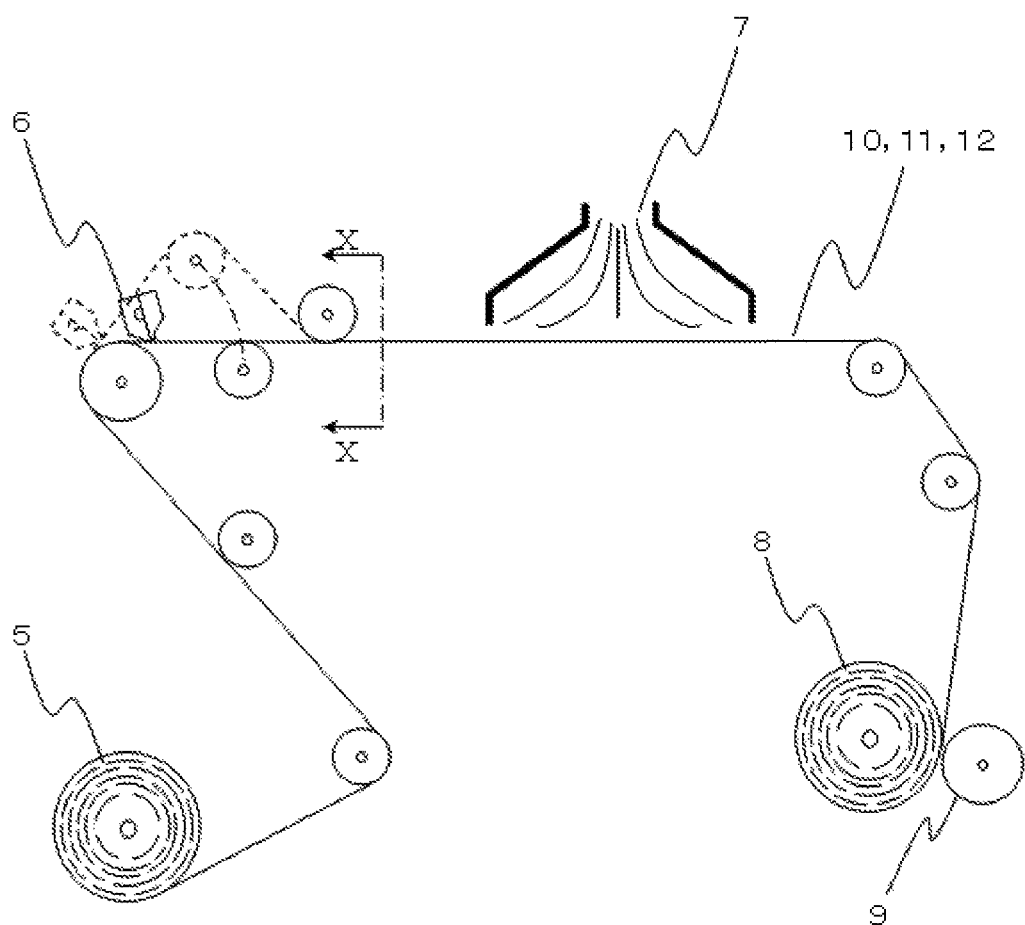
FIG. 3 A schematic view of a device for manufacturing the adhesive sheet of the present invention.
Figure 4:
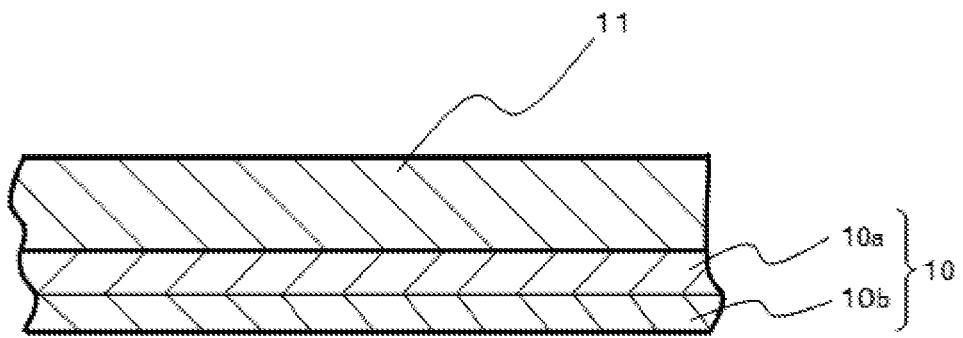
FIG. 4 A schematic sectional view of the adhesive sheet of the present invention in a stage in which only an upper adhesive layer is formed on the release film.
Figure 5:
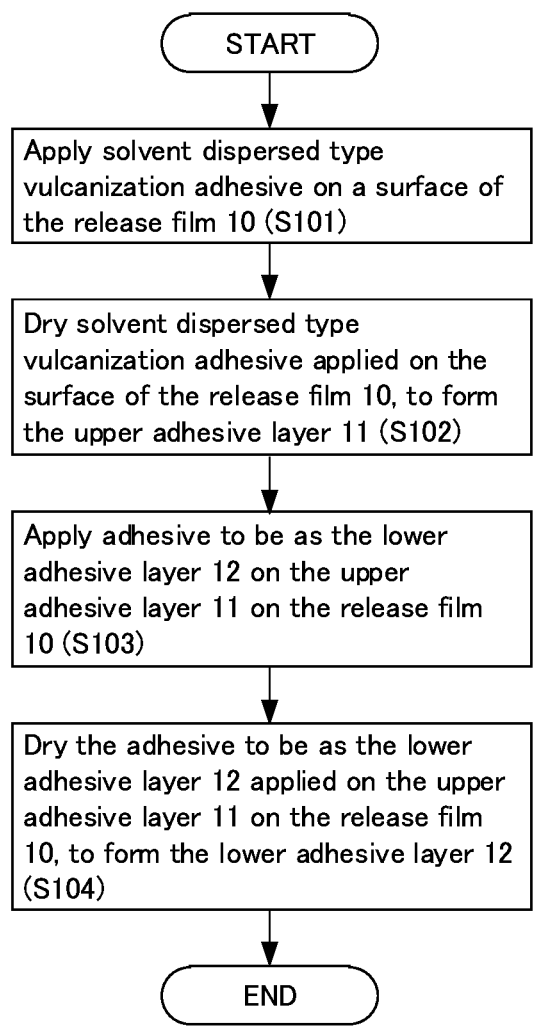
FIG. 5 An operation flow diagram for illustrating a flow of a manufacturing process of the adhesive sheet.

The manufacturing process of the adhesive sheet 1 according to Embodiment 1 of the present invention is described with reference to FIG. 3 to FIG. 5. FIG. 3 is a schematic view of a device for manufacturing the adhesive sheet 1 of the present invention. Both the upper adhesive layer 11 and the lower adhesive layer 12 are formed in the same manner. In FIG. 3, in the step of applying the upper adhesive layer 11 before forming the lower adhesive layer 12, the X-X cross-section is as illustrated in FIG. 4. When the lower adhesive layer 12 is formed after the upper adhesive layer 11 is applied, the X-X cross-section of FIG. 3 turns to that of the adhesive sheet 1 in a completed state as in the state of FIG. 1. FIG. 5 is an operation flow diagram for illustrating a flow of the manufacturing process of the adhesive sheet 1.

First, the release film 10 is manufactured. The adhesive 10c is applied to the second film 10b. The second film 10b having an adhesive layer in advance may be used. Then, one surface of the first film 10a is brought into contact with the adhesive 10c and pressed against the adhesive 10c while a pressure is applied thereto, to thereby form one release film 10. The resultant release film 10 is arranged into a roll shape and wound around a roller 5. The release film 10 is continuously supplied from the roller 5 at a constant speed.

The "solvent dispersed type vulcanization adhesive" having reactivity with a rubber 30 is applied onto a surface of the first film 10a forming the release film 10 (S101). For example, as illustrated in FIG. 3, the solvent dispersed type vulcanization adhesive is uniformly applied to a predetermined thickness to one surface of the release film 10 supplied from the roller 5 at a constant speed. As a method of uniformly applying the solvent dispersed type vulcanization adhesive to a predetermined thickness, various methods are conceivable. Preferred methods include: applying the solvent dispersed type vulcanization adhesive through use of an application roller; applying the solvent dispersed type vulcanization adhesive by a microgravure roll coating method through use of a microgravure (trademark) head arranged in an application device; and transferring or discharging the adhesive by a slot die coating method using a slot die head arranged in an application device, a reverse roll coating method arranged in an application device, or a knife coating method arranged in an application device. Through those methods, the thickness of a coating film can be accurately managed. In FIG. 3, as an example of those methods, there is illustrated a method of applying, through use of a slot die 6, the solvent dispersed type vulcanization adhesive to one surface of the release film 10 that is continuously supplied. It is preferred that the application thickness of the solvent dispersed type vulcanization adhesive be managed so that the thickness of the upper adhesive layer 11 to be finally formed may fall within a range of from about 10 micrometers to about 30 micrometers. A layer of the solvent dispersed type vulcanization adhesive as illustrated in FIG. 3 is formed on the release film 10 in a portion of the cross-section X-X of FIG. 3. After the application, the adhesive is dried so as to evaporate a solvent of a volatile component (S102). For example, as illustrated in FIG. 3, a high-temperature dry gas 7 is sprayed to the adhesive to heat the adhesive for a predetermined time period. The adhesive is kept at 80° C. for about 1 minute, and then kept at 120° C. for from 3 minutes to 4 minutes. With this, as illustrated in FIG. 2, the upper adhesive layer 11 of the solvent dispersed type vulcanization adhesive is formed on one surface of the release film 10. The release film 10 having the upper adhesive layer 11 formed thereon is taken up by a roller 8 while being pressed with a laminate roller 9.

After the upper adhesive layer 11 is formed on the surface of the release film 10, the lower adhesive layer 12 is formed on a further upper side surface of the upper adhesive layer 11 (surface of the upper adhesive layer 11 on an opposite side of the release film 10). An adhesive having reactivity with the metal is first applied as the lower adhesive layer 12 (S103). The manner of forming the lower adhesive layer 12 is the same as that in the case of forming the upper adhesive layer 11. The release film 10 having the upper adhesive layer 11 formed thereon is continuously supplied from the roller 5 at a constant speed so that the upper adhesive layer 11 may be placed on the side of the nozzle 6 as illustrated in FIG. 3. The adhesive is applied through use of the slot die 6 to a predetermined thickness onto the surface of the upper adhesive layer 11 of the release film 10 that is continuously supplied. It is preferred that the adhesive be applied to a thickness within a range of from 5 micrometers to 25 micrometers. It is preferred that the application thickness be set so that the thickness of the lower adhesive layer 12 to be finally formed may fall within a range of from about 10 micrometers to about 30 micrometers. The layer of the solvent dispersed type vulcanization adhesive as illustrated in FIG. 3 is formed on the release film 10 in the portion of the cross-section X-X of FIG. 3. After the application, the adhesive is dried so as to evaporate a solvent of a volatile component (S104). The high-temperature dry gas 7 is sprayed to the adhesive to dry the adhesive as illustrated in FIG. 3. As a result, as illustrated in FIG. 3, the upper adhesive layer 11 of the solvent dispersed type vulcanization adhesive is formed on one surface of the release film 10, and the lower adhesive layer 12 is further formed on the upper adhesive layer 11. The release film 10 having the upper adhesive layer 11 and the lower adhesive layer 12 formed thereon is taken up by the roller 8 while being pressed with the laminate roller 9. With this, the adhesive sheet 1 is completed.

Figure 6:
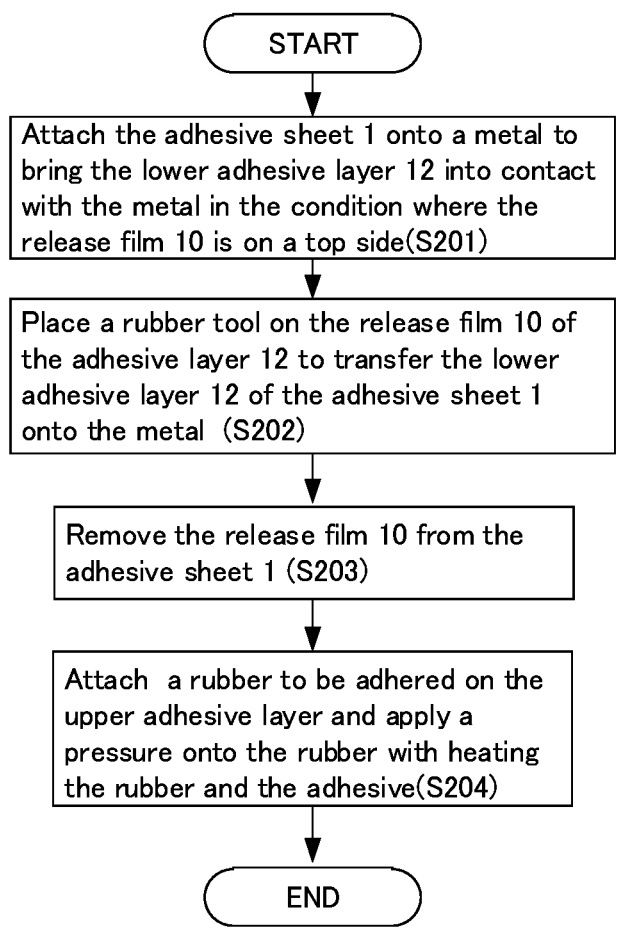
FIG. 6 An operation flow diagram for illustrating typical steps of bonding a metal and an unvulcanized rubber to each other through use of the adhesive sheet.
Figure 7:
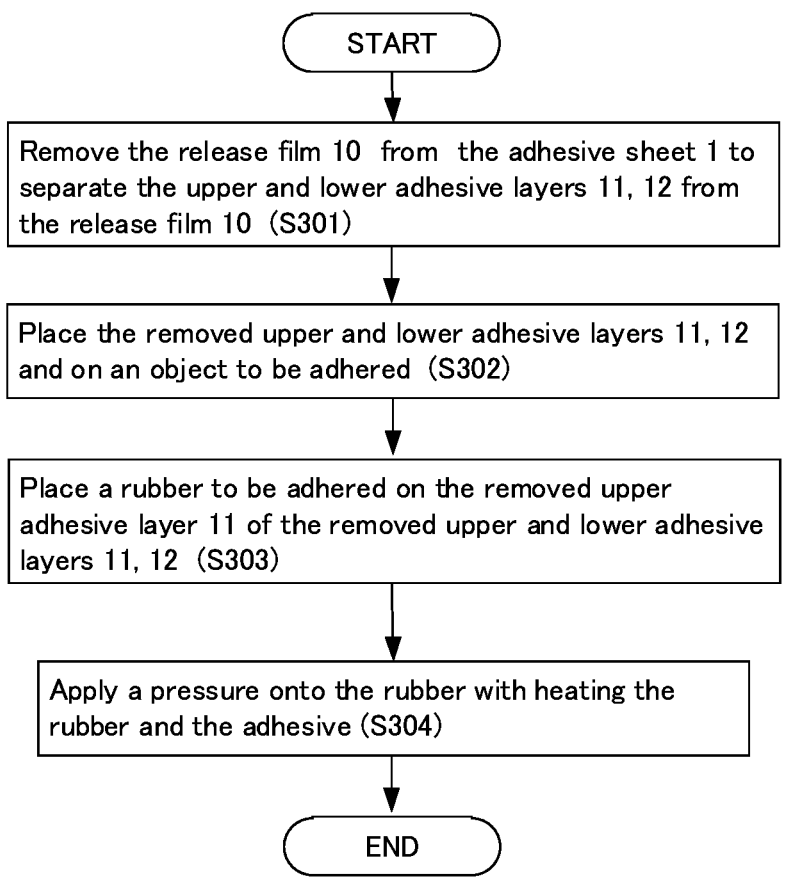
FIG. 7 Another operation flow diagram for illustrating typical steps of bonding the metal and the unvulcanized rubber to each other through use of the adhesive sheet.
Figure 8:
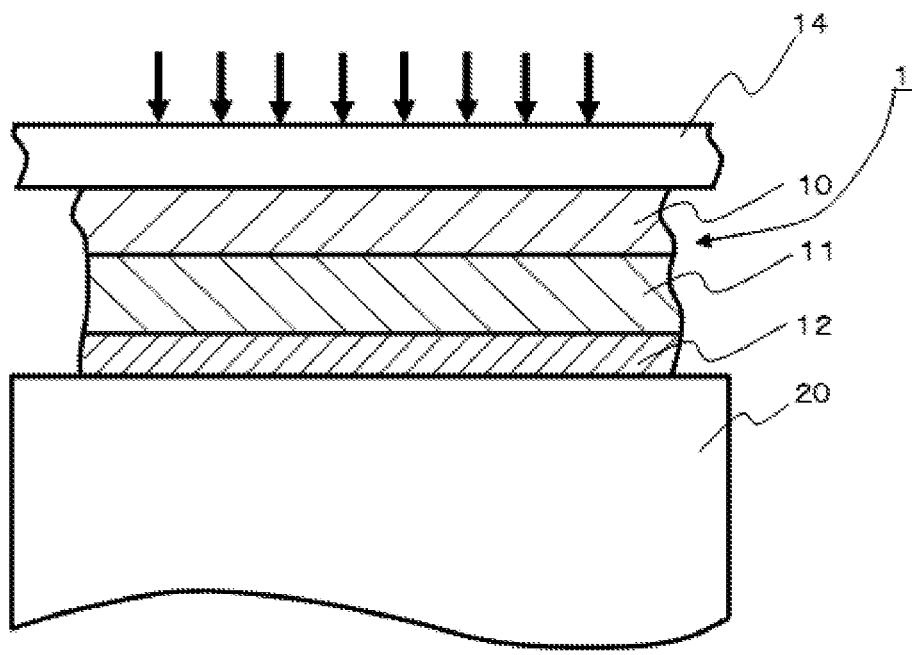
FIG. 8 A view for illustrating a step (before removing the film) at a time of the bonding of the metal and the unvulcanized rubber to each other through use of the adhesive sheet.
Figure 9:
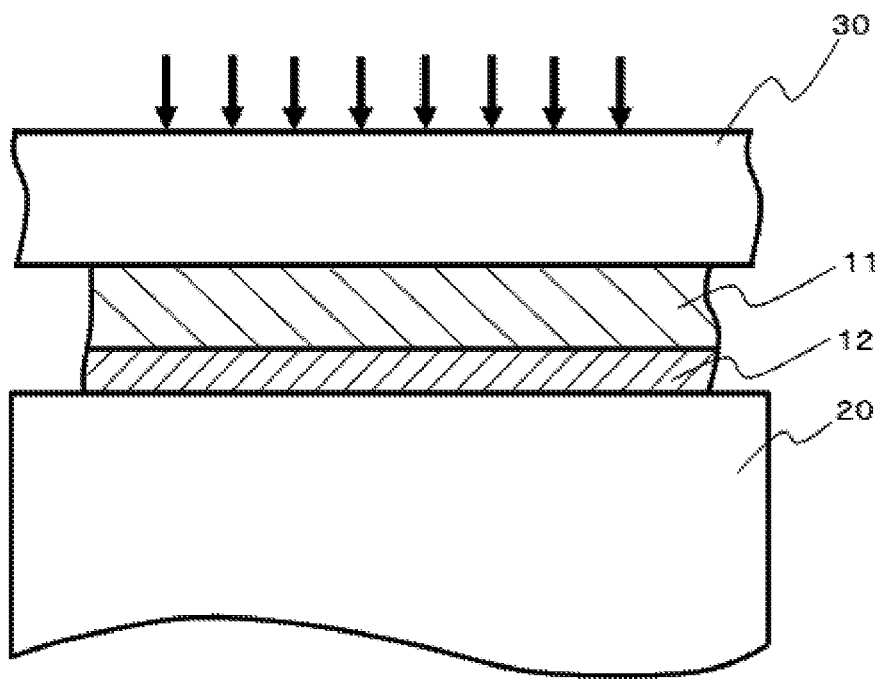
FIG. 9 A view for illustrating a step (after removing the film) at a time of the bonding of the metal and the unvulcanized rubber to each other through use of the adhesive sheet.

Subsequently, a method of bonding a metal 20 and an unvulcanized rubber 30 to each other through use of the adhesive sheet 1 is described with reference to FIG. 6 to FIG. 9. FIG. 6 is one typical example of an operation flow diagram for illustrating the steps of bonding the metal 20 and the unvulcanized rubber 30 to each other through use of the adhesive sheet 1. FIG. 7 is another typical example of an operation flow diagram for illustrating the steps of bonding the metal 20 and the unvulcanized rubber 30 to each other through use of the adhesive sheet 1. FIG. 8 and FIG. 9 are each a view for illustrating a step at a time of the bonding of the metal 20 and the unvulcanized rubber 30 to each other through use of the adhesive sheet 1.

First, as illustrated in FIG. 8, the adhesive sheet 1 is pressed against the metal 20 to be adhered. A surface of the lower adhesive layer 12 on an opposite side of the upper adhesive layer 11 is pressed against the metal 20 to be fixed thereon (S201). In this state, a rubber mat 14 is placed on the release film 10, and the metal 20 is heated while a pressure is uniformly applied to the rubber mat 14, to thereby transfer the lower adhesive layer 12 to the metal 20 (S202). After the lower adhesive layer 12 is transferred and firmly fixed to the metal 20, the release film 10 is removed from the upper adhesive layer 11, and the unvulcanized rubber 30 to be adhered is placed on a surface from which the release film 10 has been removed, as illustrated in FIG. 8. After that, a pressure is applied to the rubber 30 with heating of the rubber 30 and the upper adhesive layer 11, to thereby vulcanize the unvulcanized rubber and firmly fix the upper adhesive layer and the rubber to each other (S204).

Here, as described above, when a site to be adhered is, for example, a surface having a complicated shape, the second film layer 10b is separated from the first film layer 10a in advance before the step of pressing and fixing the surface of the lower adhesive layer 12 to the metal 20 (S201). That is, after a state in which the release film 10 in FIG. 8 is formed of only the second film layer 10b is established, the steps S201 to S204 are performed.

Further, in the release film 10 of the adhesive sheet 1 of the present invention, the polypropylene film having satisfactory releasability is reinforced with polyethylene terephthalate, and hence the step illustrated in FIG. 9 can be directly performed without the performance of the step illustrated in FIG. 8 as in the steps illustrated in FIG. 7. That is, the upper adhesive layer 11 and the lower adhesive layer 12 are separated from the release film 10 in advance (S301). Of the removed upper adhesive layer 11 and lower adhesive layer 12, the lower adhesive layer 12 is brought into contact with the metal 20 (S302). Meanwhile, the rubber mat 14 is placed on the upper adhesive layer 11 (S302). Then, a pressure is applied to the rubber mat 14, and simultaneously, a pressure can also be applied to the upper adhesive layer 11 and the lower adhesive layer 12.

With this, the release film 10 having satisfactory releasability can be formed, and creases are not formed in the release film 10. Therefore, there are advantageous effects in that creases are not formed in the transferred upper adhesive layer 11 and lower adhesive layer 12, and the thicknesses of the upper adhesive layer 11 and the lower adhesive layer 12 become uniform.

REFERENCE SIGNS LIST 1 adhesive sheet
5, 8 roller
10 laminate roller
10 release film
10a first film
10b second film
11 upper adhesive layer
12 lower adhesive layer

The invention claimed is:

1. An adhesive sheet for bonding an unvulcanized rubber provided besides the adhesive sheet onto a metal, comprising:
 a release film having a first film layer made of polypropylene and a second film layer made of polyethylene terephthalate, the first film layer and the second film layer formed as an integrated film;
 an upper adhesive layer formed by applying a solvent dispersed type vulcanization adhesive including a polymer compound containing a cross-linking agent having reactivity with the unvulcanized rubber, the cross-linking agent determined according to a type of the unvulcanized rubber, to a side of the first film layer of the release film, and by drying the solvent dispersed type vulcanization adhesive onto the upper adhesive layer, wherein the upper adhesive layer has reactivity to cause vulcanization with the cross-linking agent by being heated and pressured to adhere the unvulcanized rubber; and a lower adhesive layer having reactivity with the metal, formed with a lower layer adhesive whose components includes at least one selected from phenol and a phenol-based derivative resin, a bisphenol-based epoxy resin, a polyfunctional aromatic epoxy resin, a chlorinated natural rubber, chlorine-based polyethylene, chlorinated polypropylene, chlorinated polyolefin, an acid scavenger, an amine-based curing agent, a silica-based filler, and carbon black and is different from compositions of the upper adhesive layer, by applying the lower layer adhesive onto the upper adhesive layer after drying the upper adhesive layer and drying the lower layer adhesive.

2. An adhesive sheet according to claim 1, wherein the first film layer has a thickness smaller than a thickness of the second film layer.

3. An adhesive sheet according to claim 1,
wherein the integrated film is formed by applying an adhesive to any one of the first film layer and the second film layer to pressure and bond the first film layer and the second film layer with each other, and
wherein the first film layer and the second film layer are capable of being separated from the release film after the upper adhesive layer and the lower adhesive layer are formed into the release film.

4. An adhesive sheet according to claim 1, wherein the integrated film is formed by subjecting the first film layer and the second film layer to coextrusion.

5. An adhesive sheet according to claim 1,
wherein the first film layer has a thickness of 10 micrometers or more and 50 micrometers or less, and
wherein the second film layer has a thickness within a range of from 10 micrometers to 300 micrometers.

6. An adhesive sheet according to claim 1, wherein the release film has a thickness of from 20 micrometers to 30 micrometers.

7. An adhesive sheet according to claim 1, wherein the adhesive sheet is configured to bond the unvulcanized rubber to the metal as described below, in a state in which the metal is placed on a lower side of the adhesive sheet, a surface of the lower adhesive layer that is opposite to a surface on which the upper adhesive layer exists is pressed onto an upper surface of the metal, and a rubber member is placed on the release film, and the metal is heated while a pressure is uniformly applied to the rubber member, and the release film is removed from the upper adhesive layer after the lower adhesive layer is firmly fixed to the metal, and the unvulcanized rubber provided besides the adhesive sheet is placed on a surface of the upper adhesive layer from which the release film the upper adhesive layer is removed and pressured with heating onto the surface from which the release film has been removed, to thereby vulcanize the unvulcanized rubber and firmly fix the upper adhesive layer and the unvulcanized rubber to each other.

8. An adhesive sheet according to claim 1,
wherein the application of the solvent dispersed type vulcanization adhesive is performed by discharging the solvent dispersed type vulcanization adhesive from an application head arranged in an application device onto the release film that is continuously supplied, and
wherein the application of the adhesive having reactivity with the metal is performed by discharging, after heating the solvent dispersed type vulcanization adhesive applied onto the release film for a predetermined time period, the adhesive having reactivity with the metal from the application head arranged in the application device onto the upper adhesive layer formed on the release film that is continuously supplied.

9. An adhesive sheet according to claim 1,
wherein the upper adhesive layer has a thickness within a range of from 10 micrometers to 30 micrometers, and
wherein the lower adhesive layer has a thickness within a range of from 5 micrometers to 25 micrometers.

10. A method of bonding an unvulcanized rubber to a metal through use of the adhesive sheet of claim 1,
the method comprising the steps of:
pressing the lower adhesive layer of the adhesive sheet onto an upper surface of the metal to fix the lower adhesive layer to the upper surface of the metal;
heating the metal while uniformly applying a pressure to the release film;
after firmly fixing the lower adhesive layer to the metal, removing the release film from the upper adhesive layer; and
applying a pressure, with heating, to the unvulcanized rubber on a surface of the upper adhesive layer from which the release film has been removed, to thereby vulcanize the unvulcanized rubber and firmly fix the upper adhesive layer and the unvulcanized rubber to each other.

11. An adhesive sheet according to claim 2,
wherein the first film layer has a thickness of 10 micrometers or more and 50 micrometers or less, and
wherein the second film layer has a thickness within a range of from 10 micrometers to 300 micrometers.

12. An adhesive sheet according to claim 2, wherein the release film has a thickness of from 20 micrometers to 30 micrometers.

13. An adhesive sheet according to claim 3,
wherein the first film layer has a thickness of 10 micrometers or more and 50 micrometers or less, and
wherein the second film layer has a thickness within a range of from 10 micrometers to 300 micrometers.

14. An adhesive sheet according to claim 3, wherein the release film has a thickness of from 20 micrometers to 30 micrometers.

15. An adhesive sheet according to claim 4,
wherein the first film layer has a thickness of 10 micrometers or more and 50 micrometers or less, and
wherein the second film layer has a thickness within a range of from 10 micrometers to 300 micrometers.

16. An adhesive sheet according to claim 4, wherein the release film has a thickness of from 20 micrometers to 30 micrometers.

17. An adhesive sheet according to claim 2,
wherein the upper adhesive layer has a thickness within a range of from 10 micrometers to 30 micrometers, and
wherein the lower adhesive layer has a thickness within a range of from 5 micrometers to 25 micrometers.

18. An adhesive sheet according to claim 3,
wherein the upper adhesive layer has a thickness within a range of from 10 micrometers to 30 micrometers, and
wherein the lower adhesive layer has a thickness within a range of from 5 micrometers to 25 micrometers.

19. An adhesive sheet according to claim 4,
wherein the upper adhesive layer has a thickness within a range of from 10 micrometers to 30 micrometers, and
wherein the lower adhesive layer has a thickness within a range of from 5 micrometers to 25 micrometers.

* * * * *